US009912803B1

(12) United States Patent
Haikin et al.

(10) Patent No.: US 9,912,803 B1
(45) Date of Patent: Mar. 6, 2018

(54) RECORDING DETECTION DURING A COMMUNICATION SESSION

(71) Applicant: I.M.N.A SOLUTIONS LTD, Havatzelet Hasharon (IL)

(72) Inventors: Israel Haikin, Havatzelet Hasharon (IL); Dan Abitbol, Ashdod (IL)

(73) Assignee: I.M.N.A SOLUTIONS LTD, Havatzelet Hasharon (IL)

( * ) Notice: Subject to any disclaimer, the term of this patent is extended or adjusted under 35 U.S.C. 154(b) by 0 days.

(21) Appl. No.: 15/604,699

(22) Filed: May 25, 2017

(51) Int. Cl.
| H04M 1/24 | (2006.01) |
| H04M 3/08 | (2006.01) |
| H04M 3/22 | (2006.01) |
| H04M 3/20 | (2006.01) |
| H04L 12/26 | (2006.01) |

(52) U.S. Cl.
CPC ........ *H04M 3/205* (2013.01); *H04L 43/0864* (2013.01); *H04L 43/14* (2013.01); *H04M 2203/60* (2013.01)

(58) Field of Classification Search
USPC ....................................... 379/7, 35
See application file for complete search history.

(56) References Cited

U.S. PATENT DOCUMENTS

| 4,658,099 | A  | * | 4/1987 | Frazer ..................... H04B 3/46 379/27.06 |
| 6,763,099 | B1 | * | 7/2004 | Blink ..................... H04M 3/002 379/189 |
| 2002/0085686 | A1 | * | 7/2002 | Cullis .................. H04M 3/533 379/67.1 |
| 2016/0253508 | A1 | * | 9/2016 | Song ..................... G06F 21/554 726/29 |
| 2017/0054755 | A1 | * | 2/2017 | Mendiratta ............. H04L 63/20 |

* cited by examiner

*Primary Examiner* — Quoc D Tran
(74) *Attorney, Agent, or Firm* — Soroker Agmon Nordman

(57) ABSTRACT

A method of identifying recording of a conversation during a communication session, including establishing a communication session between a first participant and one or more remote participants, transmitting audio packets from a communication device of the first participant to the one or more remote participants, receiving audio packets from the one or more remote participants, including echo packets responsive to the transmitted audio packets, analyzing the received audio packets by an analysis application to identify delays in the echo packets relative to the transmitted packets providing an indication of the presence of a recording application at a communication device of a remote participant, notifying the communication device of the first participant.

20 Claims, 2 Drawing Sheets

RECORDING DETECTION DURING A COMMUNICATION SESSION

FIELD OF THE DISCLOSURE

The present disclosure relates generally to detection of recording of a conversation during a communication session and more specifically detecting the recording based on packets of the communication session.

BACKGROUND OF THE DISCLOSURE

Phone conversations can be held between two or more participants located in different locations, sometimes in different countries and/or continents. The phone conversations may be performed using two or more communication devices, such as mobile phones or landline phones. The participants may share sensitive information during the conversation, such as personal data, financial data, legal data, confidential data, data regarding employment, security, safety and the like.

In many cases, information is shared by a first participant based on the presumption that the information is not being recorded by the other participants and if the first participant knew that the information is being recorded he/she would not reveal certain information or use certain phrases or language, which may be problematic for the first participant if a playback of the conversation is played for other people.

Generally the first participant has no way of knowing if the conversation is being recorded by the second participant unless the second participant informs the first participant.

SUMMARY OF THE DISCLOSURE

An aspect of an embodiment of the disclosure, relates to a system and method for determining if a telephone conversation is being recorded by any of the communication devices of the participants based on the audio signal of the conversation. An analysis application is installed in the communication device of a first participant and optionally in communication devices of any other participant. The analysis application monitors the timing of audio packets transmitted from the first participant to the other participants relative to the timing of echo audio packets returned from the other participants. The results of the monitoring are used to determine if the echo audio packets are being returned directly or if the transmitted audio packets are manipulated before forming and/or returning the echo audio packets.

In some embodiments of the disclosure, the results of the monitoring are provided to a server that executes a statistical model for analyzing the results from many communication devices. Optionally, the analysis application determines the type of communication device used by each participant. The server may be provided with the information about the type of communication device used by the participants.

In an exemplary embodiment of the disclosure, the analysis application at the first participant injects special audio packets into the audio packets transmitted to the other participants. The special audio packets include special sounds for a short duration (e.g. pulses) to enhance the ability to identify the echo of these packets. Alternatively or additionally, the special packets include frequencies which are not representative of normal speech, for example frequencies on the boundary of the bandwidth that can be transferred over a communication channel. Optionally, these packets will be less attenuated and provide a stronger echo.

In some embodiments of the disclosure, the analysis application determines directly if recording software is used on the communication device in which it is installed and can notify analysis applications on other communication devices, which are conducting a communication session with the first participant. Optionally, such a notification may take precedence over analysis of the audio signal or if the audio signal provides a strong indication (e.g. with a high probability) that recording software is being used, the analysis may take precedence.

There is thus provided according to an exemplary embodiment of the disclosure, a method of identifying recording of a conversation during a communication session, comprising:

Establishing a communication session between a first participant and one or more remote participants;

Transmitting audio packets from a communication device of the first participant to the one or more remote participants;

Receiving audio packets from the one or more remote participants, including echo packets responsive to the transmitted audio packets;

Analyzing the received audio packets by an analysis application to identify delays in the echo packets relative to the transmitted packets providing an indication of the presence of a recording application at a communication device of a remote participant;

Notifying the communication device of the first participant.

In an exemplary embodiment of the disclosure, the results of the analyzing are provided to a remote server to determine if the results provide an indication of the presence of a recording application at a communication device of a remote participant. Optionally, the remote server determines based on a statistical model that was trained empirically. In an exemplary embodiment of the disclosure, the communication device of the first participant injects special audio packets into the transmitted audio packets. Optionally, the duration of injected special audio packets is short so that the audio they produce is not noticeable by a participant. In an exemplary embodiment of the disclosure, the special audio packets contain audio information having frequencies that are not noticeable by a participant. Optionally, the analysis application further determines if recording software is being executed at the communication device of the first participant. In an exemplary embodiment of the disclosure, the analysis application notifies other participants of a communication session if recording software is being executed at the communication device of the first participant. Optionally, the analysis application delays transmission of selected audio packets. In an exemplary embodiment of the disclosure, the analysis application determines the type of communication devices used by the one or more remote participants.

There is further provided according to an exemplary embodiment of the disclosure, a system for identifying recording of a conversation during a communication session, comprising:

A communication device for establishing a communication session between a first participant using the communication device and one or more remote participants; wherein the communication device is configured to transmit audio packets to the one or more remote participants; and receive audio packets from the one or more remote participants, including echo packets responsive to the transmitted audio packets;

An analysis application that is installable on the communication device to analyze the received audio packets to identify delays in the echo packets relative to the transmitted packets providing an indication of the presence of a recording application at a communication device of a remote participant; and wherein the analysis application is configured to notify the communication device of the first participant.

In an exemplary embodiment of the disclosure, the results of the analysis are provided to a remote server to determine if the results provide an indication of the presence of a recording application at a communication device of a remote participant. Optionally, the remote server determines based on a statistical model that was trained empirically. In an exemplary embodiment of the disclosure, the communication device of the first participant injects special audio packets into the transmitted audio packets. Optionally, the duration of injected special audio packets is short so that the audio they produce is not noticeable by a participant. In an exemplary embodiment of the disclosure, the special audio packets contain audio information having frequencies that are not noticeable by a participant. Optionally, the analysis application further determines if recording software is being executed at the communication device of the first participant. In an exemplary embodiment of the disclosure, the analysis application notifies other participants of a communication session if recording software is being executed at the communication device of the first participant. Optionally, the analysis application delays transmission of selected audio packets. In an exemplary embodiment of the disclosure, the analysis application determines the type of communication devices used by the one or more remote participants.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

The subject matter relates to a system and a method for providing an indication to participants in an audio communication session (e.g. a telephone conversation or conference call) if the communication device of any of the participants is recording the communication session. The indication is based on analysis of the audio signals of the communication session by an analysis application. Alternatively, communication devices with the analysis application may be configured to notify each other if a recording application is active at the communication device on which it is installed.

Figure 1:
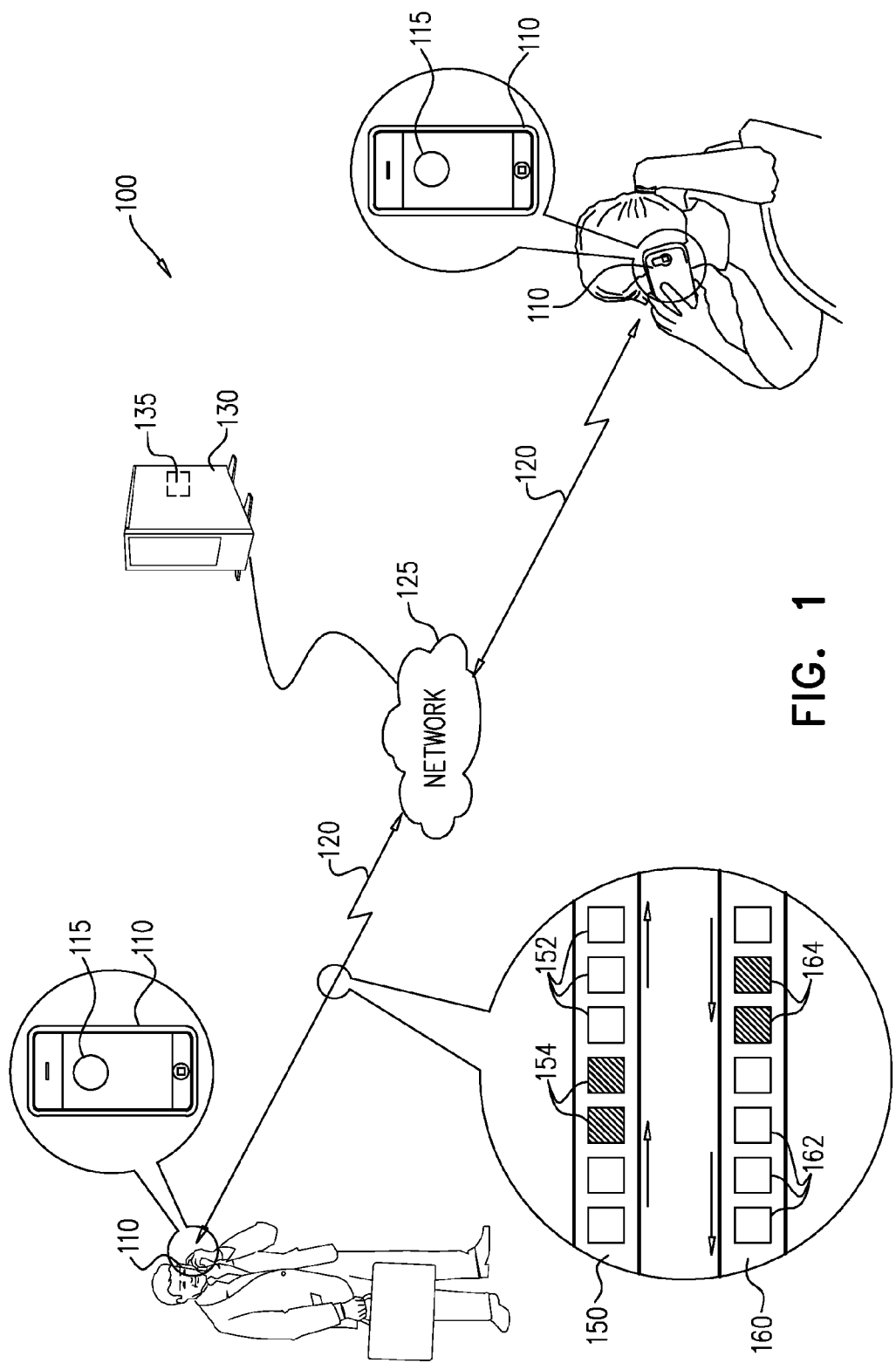
FIG. 1 is a schematic illustration of a communication environment, according to an exemplary embodiment of the disclosure.

FIG. 1 is a schematic illustration of a communication environment 100, according to an exemplary embodiment of the disclosure. In an exemplary embodiment of the disclosure, one or more communication devices 110 conduct a communication session by transmitting audio signals 120 over a communication network 125. Optionally, the communication devices 110 can include landline telephones, mobile telephones, smartphones, tablet computers, laptop computers, desktop computers and other devices that enable conducting communication sessions (e.g. VOIP, PSTN or Cellular based sessions).

In an exemplary embodiment of the disclosure, an analysis application 115 is installed on one or more of the communication devices 110. The analysis application is programed to analyze audio signals 120 during the communication session and detect discrepancies that indicate if the audio signals are being manipulated (e.g. being recorded). Optionally, if the result of the analysis is positive the user is provided with an indication warning him/her that the communication session is being recorded or otherwise manipulated. Optionally, the warning may include an audio signal (e.g. beeping signal or warning message), vibrations, visual (e.g. flashing lights or a text message on a display of the communication device 110) to alert the attention of the user.

In an exemplary embodiment of the disclosure, analysis application 115 may also analyze the status of the communication device 110 in which it is installed and determine if the local communication device 110 is executing an application that is recording the communication session. Optionally, analysis application 115 notifies other communication devices 110 with analysis application 115 installed that are participating in the communication session if a recording application is detected. In some embodiments of the disclosure, the notification is provided in addition to analysis based on the audio signal 120.

It should be noted that the current disclosure, deals mainly with detecting call recording by a participating communication device and might also be applicable to detect an external device that is not electronically connected, but may be eavesdropping to the communication session. Additionally, the disclosure does not directly deal with switches and routers between the communications devices of the participants that may duplicate packets and reroute them to other devices, for example to a participating communication device and in parallel to a recording device. However it is possible that the current methods and empirical results used in implementing the current embodiments may be applicable for such cases as well.

In an exemplary embodiment of the disclosure, a communication session establishes a dedicated channel between a first participant and another participant or other participants. Optionally, each participant is provided with an uplink channel 150 and a downlink channel 160. The audio signal 120 includes packets 152 sent by the first participant over the uplink channel 150 and packets 162 received by the first participant over the downlink channel 160. Optionally, the received packets 162 include an attenuated echo of the audio data from the sent packets 152. In an exemplary embodiment of the disclosure, analysis of the timing of the attenuated echo of the audio data relative to the transmitted data will enable identification of a delay caused by a recording application at a receiving participant.

In an exemplary embodiment of the disclosure, each device includes:
1. A hardware access layer (HAL) that handles communication of packets between communication devices 110;
2. A core layer that implements standard access services, for example decoding packets based on codecs or other forms to provide data to applications;
3. An application layer that receives data for applications from uuencoded packets.

In an exemplary embodiment of the disclosure, analysis application 115 monitors the exit time and arrival time of the packets at the hardware access layer. Optionally, analysis application 115 may intentionally delay the exit of packets for a few microseconds or milliseconds to determine how it affects the arrival time of the echo of the transmitted packets, for example determining a delta between transmission to reception of delayed packets and non-delayed packets.

In some embodiments of the disclosure, analysis application 115 also determines information identifying the type of communication device and/or operating system version used by the first participant and/or the other participant or participants connected in a communication session.

In some embodiments of the disclosure analysis application 115 transmits collected information (e.g. measured time delays, device models) to a server 130 that executes a heuristic algorithm 135 based on experimentation with many devices and communication sessions with and without recording applications in the background of the communication device. Optionally, the heuristic application 135 is built as a statistical model. The statistical model may be trained based on many cases provided by multiple communication devices. The statistical model may take into account the type and model of the communication device echoing the audio signals sent from the first participant.

In an exemplary embodiment of the disclosure, server 130 receives information from multiple communication devices 110 and provides a determination for example with a probability score indicating a likelihood that a recording application is delaying echo packets 162.

In some embodiments of the disclosure, analysis application 115 injects special audio packets 154 into the uplink channel 150 with special audio content, for example sounds that would not possibly be included in a conversation between two people. In the downlink 160 special echo packets 164 are then more easily identified in response to the special audio packets to enhance the ability to identify delays. Optionally, the injected packets include audio sequences of varying length to enhance the ability to identify delays due to recording software in the application layer of the participating communication device or devices. The injected packets may be audible or not audible, however if they are short enough (e.g. 1 ms-10 ms) they will not be heard by the participants of the communication sessions In some embodiments of the disclosure, analysis application 115 injects special audio packets with audio data having various frequency sounds, for example frequencies that will not be attenuated by the other communication devices 110 or to a lesser extent, to enhance the ability to identify delays. For example the frequencies may include 3900-4000 Khz, which are near the edge of the communication session bandwidth and will not be heard by the participants of the communication session. In some embodiments of the disclosure, the special packets enhance analysis since their size (duration), energy and starting time is known. Optionally, analysis can determine the time for a round trip, attenuation (energy loss) and delays between packets.

Figure 2:
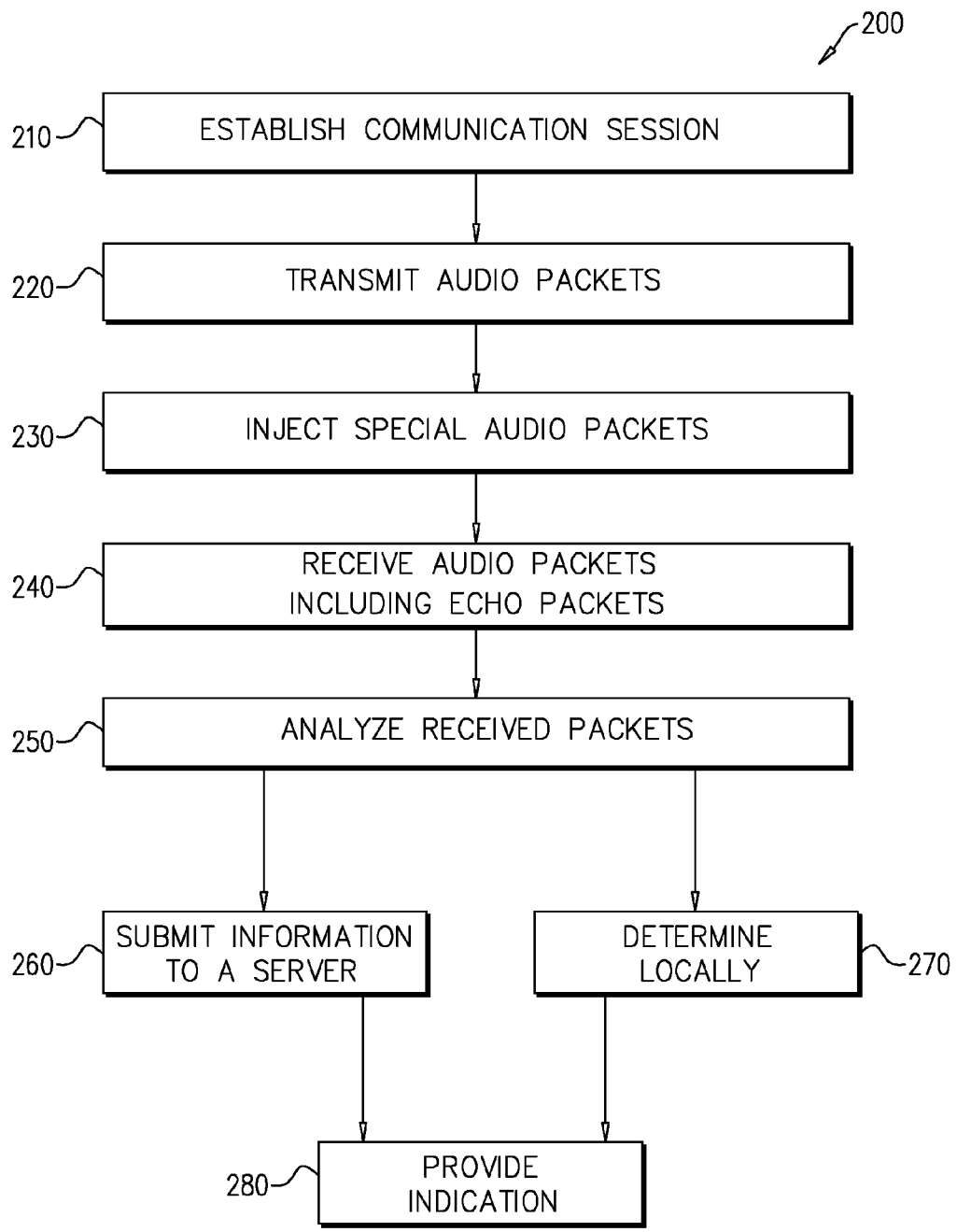
FIG. 2 is a flow diagram of a method of detecting recording during a communication session, according to an exemplary embodiment of the disclosure.

FIG. 2 is a flow diagram 200 of a method of detecting recording during a communication session, according to an exemplary embodiment of the disclosure. Initially a communication session is established (210) between two or more communication devices 110. A first participant transmits (220) audio packets 152 to the other participants. Optionally, the first participant may inject (230) special audio packets 154 into the transmitted signal 120. In response the first participant receives (240) audio packets 162, which include an echo (e.g. of attenuated audio) of the transmitted packets.

In an exemplary embodiment of the disclosure, analysis application 115 installed on the first participant's communication device 110 analyzes (250) the timing of the transmitted and received packets to identify the suspected presence of interfering applications (e.g. recording software) at the communication devices 110 of the participants communicating with the first participant. Additionally, analysis application 115 may determine which type of device is being used by the other participants.

In some embodiments of the disclosure, analysis application 115 may determine locally (270) if recording software is being used, for example providing a probability score. Alternatively or additionally, analysis application 115 may submit (260) the information to server 130. Server 130 may comprise a statistical module that receives queries from many communication devices 110 and may have been trained empirically to provide a score representing the probability of existence of recording software based on the collected results provided from an analysis application 115.

In an exemplary embodiment of the disclosure, if the score indicates that a remote participant is using recording software then an indication is provided (280) to the first participant to take precaution. The notification may be an audible alarm (e.g. beeping, ringing), visual alarm (e.g. flashing lights), tactile alarm (e.g. vibrations) or other methods of alerting the participant while conducting a conversation.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

We claim:

1. A method of identifying recording of a conversation during a communication session, comprising:
    establishing a communication session between a first participant and one or more remote participants;
    transmitting audio packets from a communication device of the first participant to the one or more remote participants;
    receiving audio packets from the one or more remote participants, including echo packets responsive to the transmitted audio packets;
    analyzing the received audio packets by an analysis application to identify delays in the echo packets relative to the transmitted packets providing an indication of the presence of a recording application at a communication device of a remote participant;
    notifying the communication device of the first participant;
    wherein the communication device of the first participant injects special audio packets into the transmitted audio packets; and
    wherein the duration of injected special audio packets is short so that the audio they produce is not noticeable by a participant.

2. The method according to claim 1, wherein the results of the analyzing are provided to a remote server to determine if the results provide an indication of the presence of a recording application at a communication device of a remote participant.

3. The method according to claim 2, wherein the remote server determines based on a statistical model that was trained empirically.

4. The method according to claim 1, wherein the analysis application further determines if recording software is being executed at the communication device of the first participant.

5. The method according to claim 4, wherein the analysis application notifies other participants of a communication session if recording software is being executed at the communication device of the first participant.

6. The method according to claim 1, wherein the analysis application delays transmission of selected audio packets.

7. The method according to claim 1, wherein the analysis application determines the type of communication devices used by the one or more remote participants.

8. A method of identifying recording of a conversation during a communication session, comprising:
   establishing a communication session between a first participant and one or more remote participants;
   transmitting audio packets from a communication device of the first participant to the one or more remote participants;
   receiving audio packets from the one or more remote participants, including echo packets responsive to the transmitted audio packets; analyzing the received audio packets by an analysis application to identify delays in the echo packets relative to the transmitted packets providing an indication of the presence of a recording application at a communication device of a remote participant;
   notifying the communication device of the first participant;
   wherein the communication device of the first participant injects special audio packets into the transmitted audio packets; and
   wherein the special audio packets contain audio information having frequencies that are not noticeable by a participant.

9. The method according to claim 8, wherein the results of the analyzing are provided to a remote server to determine if the results provide an indication of the presence of a recording application at a communication device of a remote participant.

10. The method according to claim 9, wherein the remote server determines based on a statistical model that was trained empirically.

11. A system for identifying recording of a conversation during a communication session, comprising:
   A communication device for establishing a communication session between a first participant using the communication device and one or more remote participants; wherein the communication device is configured to transmit audio packets to the one or more remote participants; and receive audio packets from the one or more remote participants, including echo packets responsive to the transmitted audio packets;
   an analysis application that is installable on the communication device to analyze the received audio packets to identify delays in the echo packets relative to the transmitted packets providing an indication of the presence of a recording application at a communication device of a remote participant;
   wherein the analysis application is configured to notify the communication device of the first participant;
   wherein the communication device of the first participant injects special audio packets into the transmitted audio packets; and
   wherein the duration of injected special audio packets is short so that the audio they produce is not noticeable by a participant.

12. The system according to claim 11, wherein the results of the analysis are provided to a remote server to determine if the results provide an indication of the presence of a recording application at a communication device of a remote participant.

13. The system according to claim 12, wherein the remote server determines based on a statistical model that was trained empirically.

14. The system according to claim 11, wherein the analysis application further determines if recording software is being executed at the communication device of the first participant.

15. The system according to claim 14, wherein the analysis application notifies other participants of a communication session if recording software is being executed at the communication device of the first participant.

16. The system according to claim 11, wherein the analysis application delays transmission of selected audio packets.

17. The system according to claim 11, wherein the analysis application determines the type of communication devices used by the one or more remote participants.

18. A system for identifying recording of a conversation during a communication session, comprising:
   A communication device for establishing a communication session between a first participant using the communication device and one or more remote participants; wherein the communication device is configured to transmit audio packets to the one or more remote participants; and receive audio packets from the one or more remote participants, including echo packets responsive to the transmitted audio packets;
   an analysis application that is installable on the communication device to analyze the received audio packets to identify delays in the echo packets relative to the transmitted packets providing an indication of the presence of a recording application at a communication device of a remote participant; and
   wherein the analysis application is configured to notify the communication device of the first participant;
   wherein the communication device of the first participant injects special audio packets into the transmitted audio packets; and
   wherein the special audio packets contain audio information having frequencies that are not noticeable by a participant.

19. The system according to claim 18, wherein the results of the analysis are provided to a remote server to determine if the results provide an indication of the presence of a recording application at a communication device of a remote participant.

20. The system according to claim 19, wherein the remote server determines based on a statistical model that was trained empirically.

* * * * *